July 22, 1969  H. SHOENFELD ET AL  3,456,372
TRANSPARENCY-VIEWING APPARATUS
Filed May 23, 1967  8 Sheets-Sheet 1
FIG.1
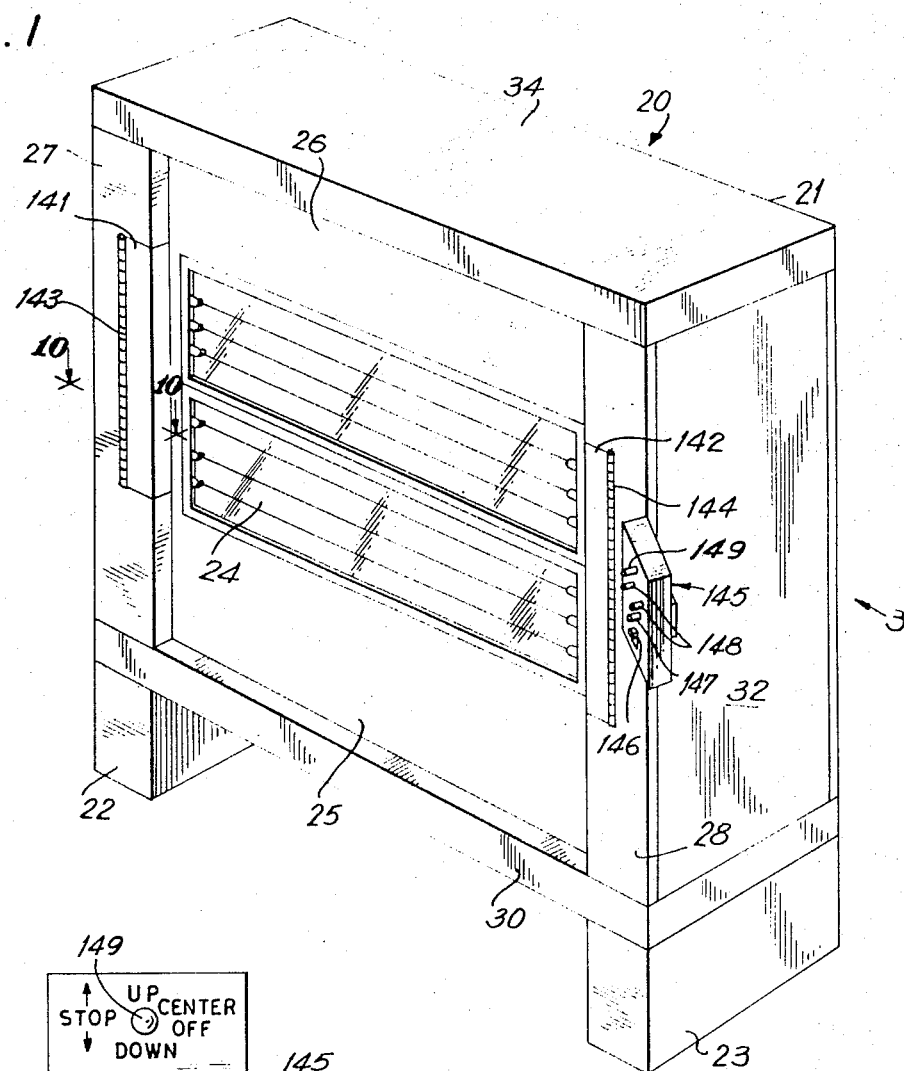
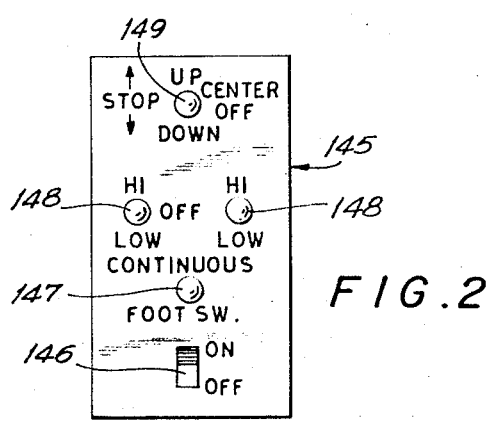
FIG.2
INVENTORS
HAROLD SHOENFELD
HAROLD WALKER
BY
ATTORNEY July 22, 1969 H. SHOENFELD ET AL 3,456,372
TRANSPARENCY-VIEWING APPARATUS
Filed May 23, 1967 8 Sheets-Sheet 2
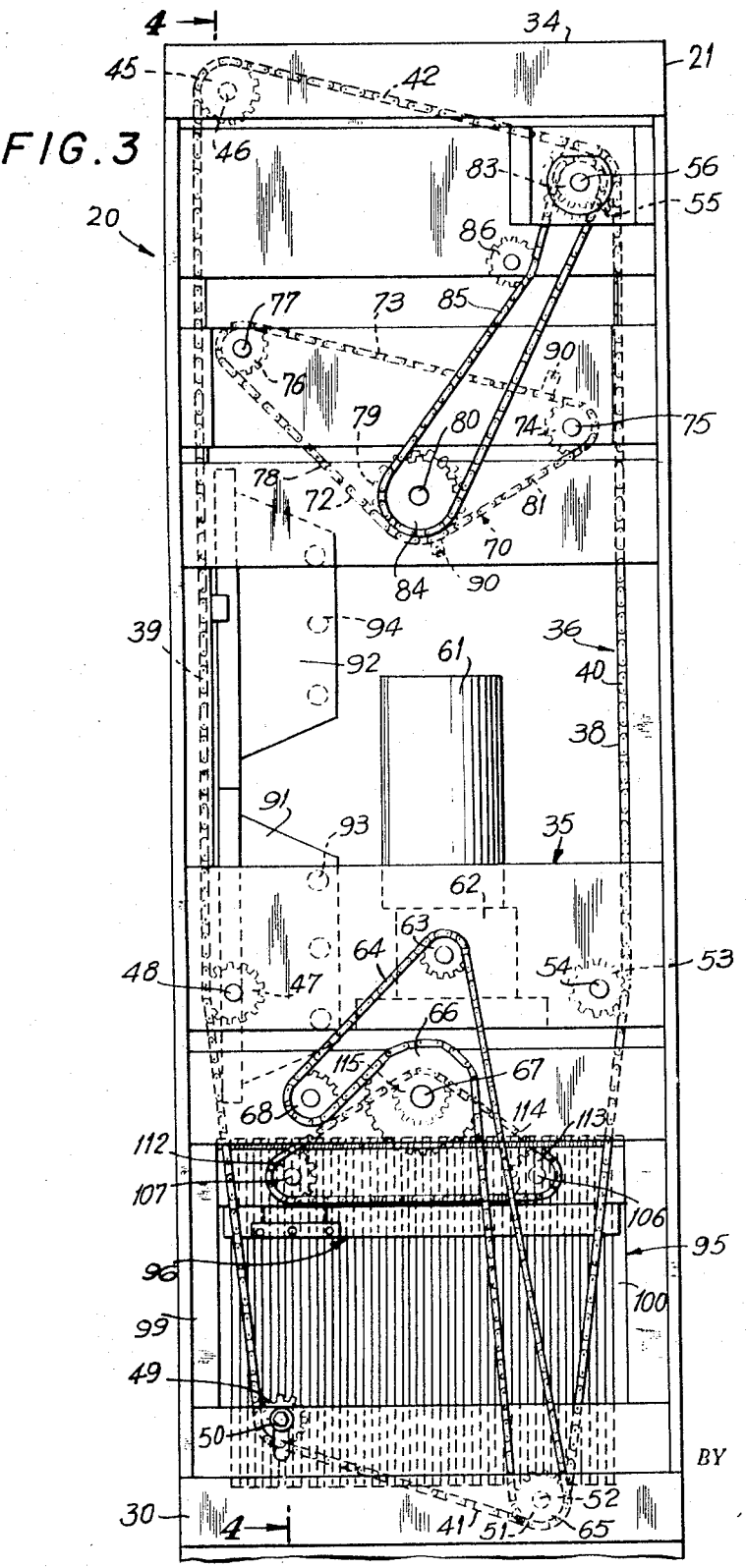
FIG.3
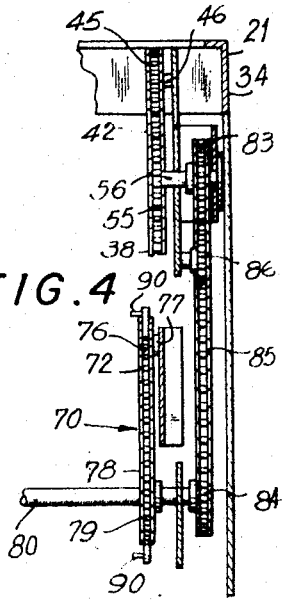
FIG.4
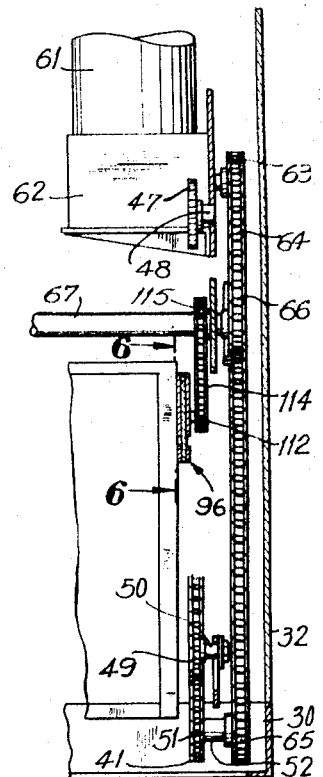
INVENTORS
HAROLD SHOENFELD
HAROLD WALKER
BY
ATTORNEY

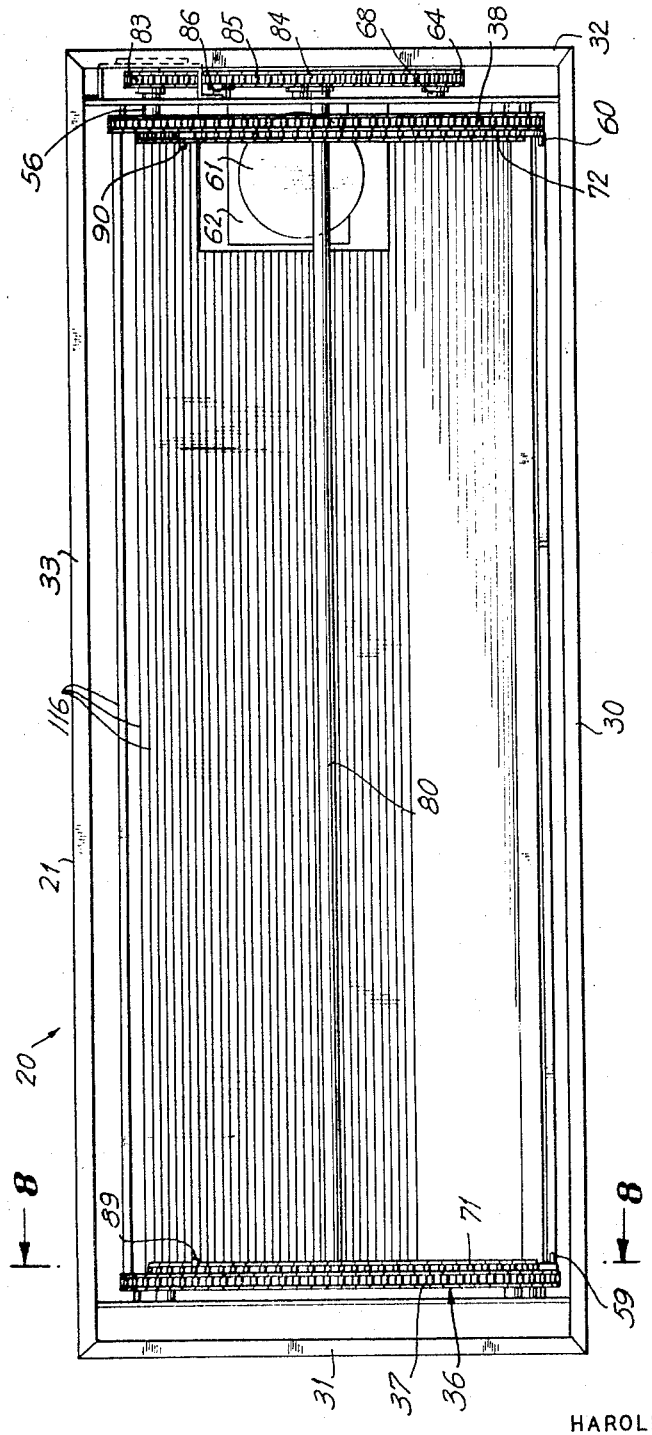

July 22, 1969 H. SHOENFELD ET AL 3,456,372
TRANSPARENCY-VIEWING APPARATUS
Filed May 23, 1967 8 Sheets-Sheet 4
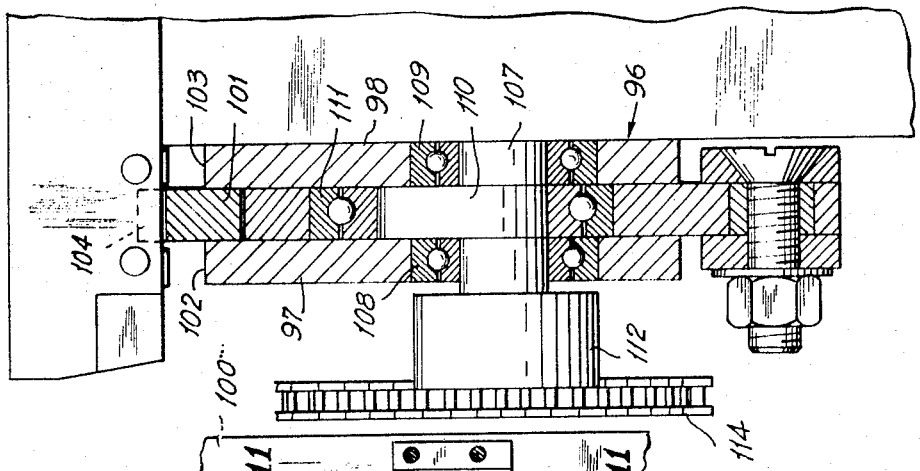
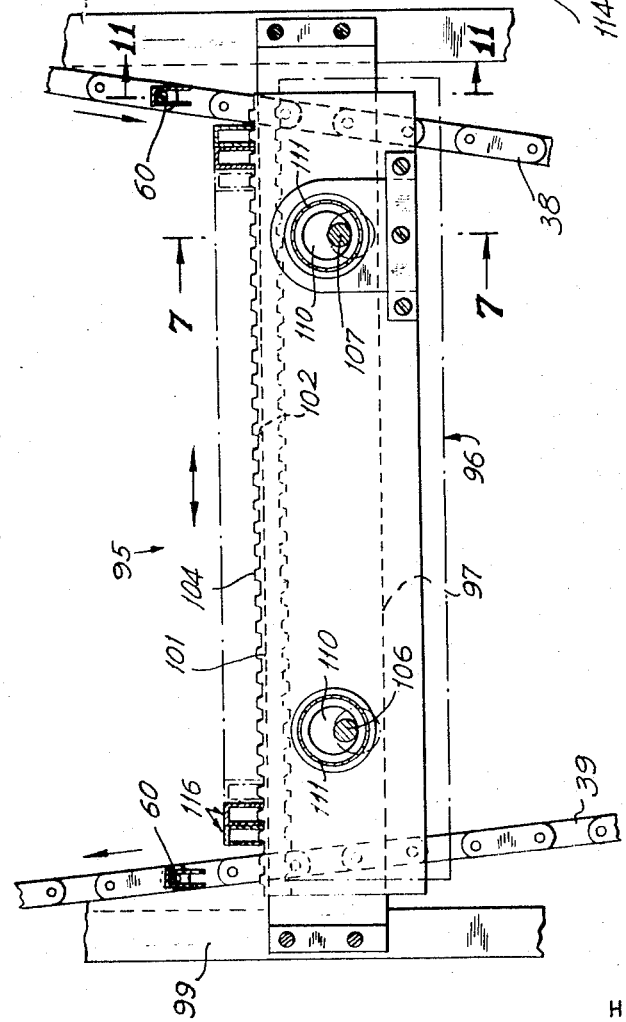
INVENTORS
HAROLD SHOENFELD
HAROLD WALKER
BY
ATTORNEY

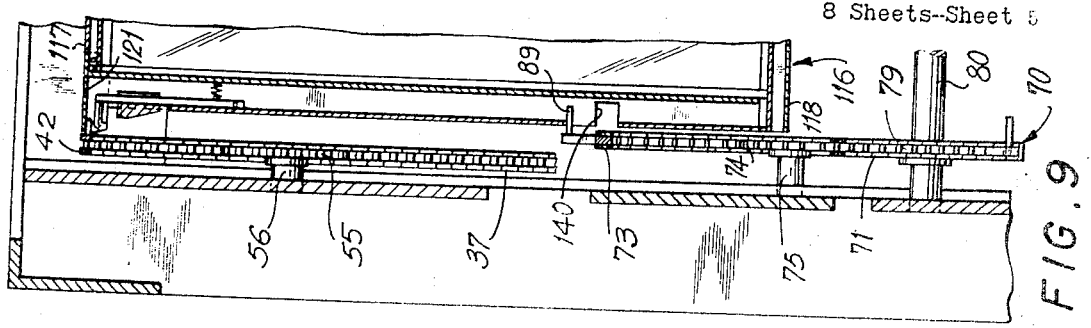
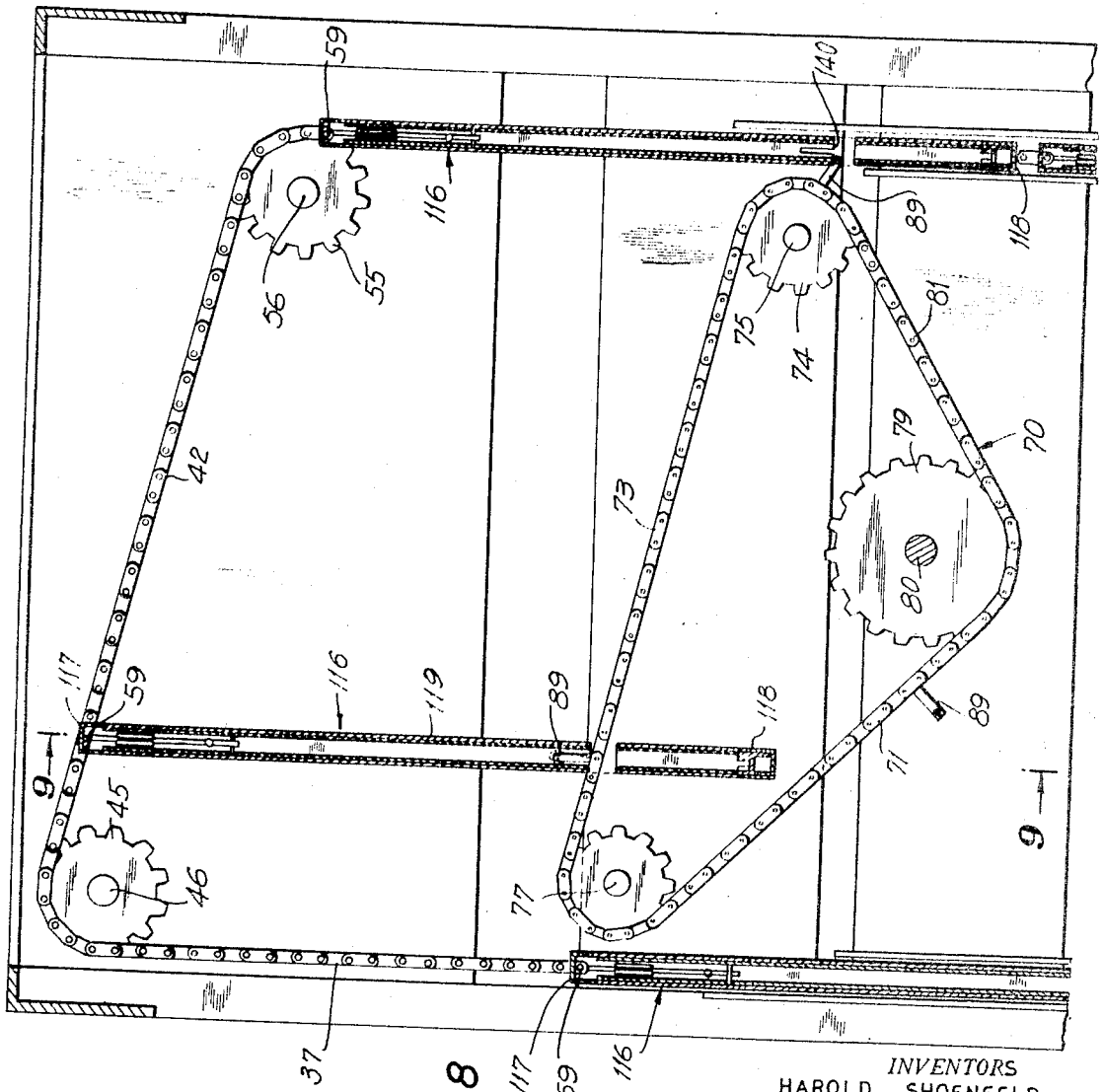

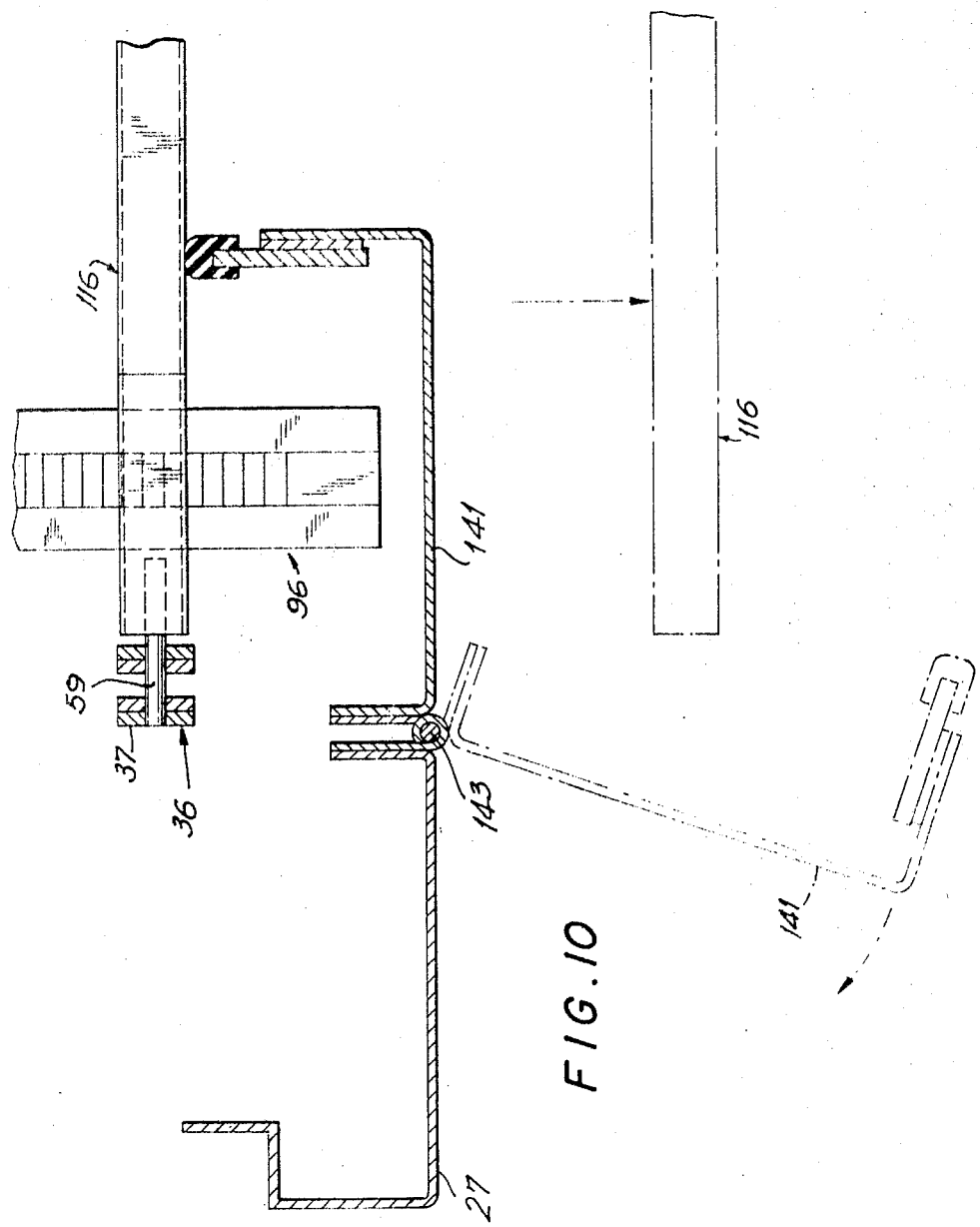

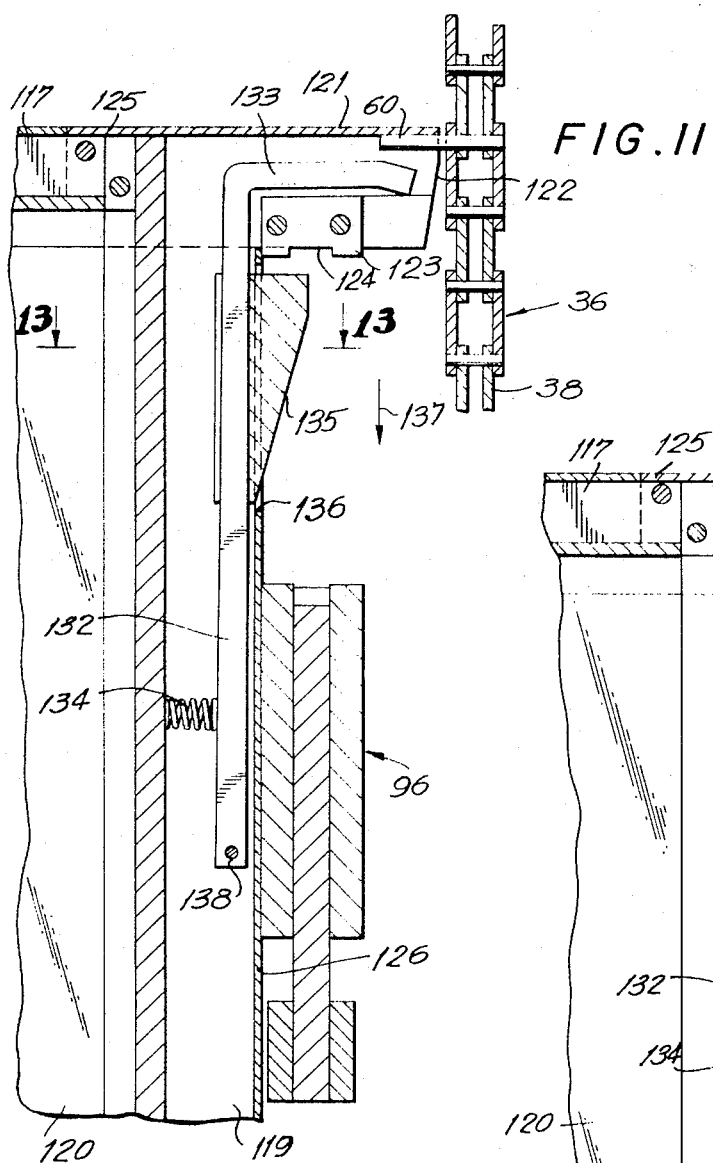
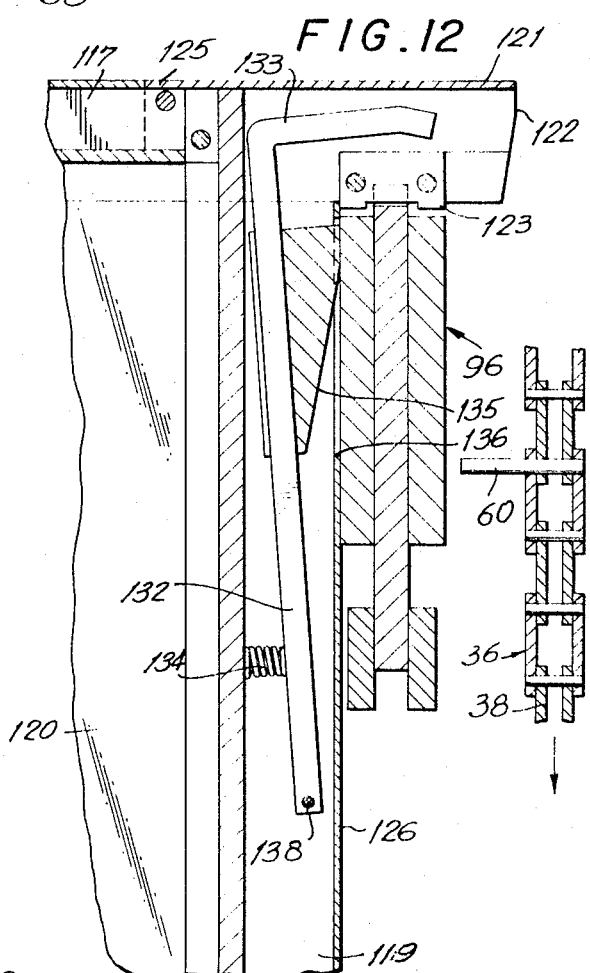
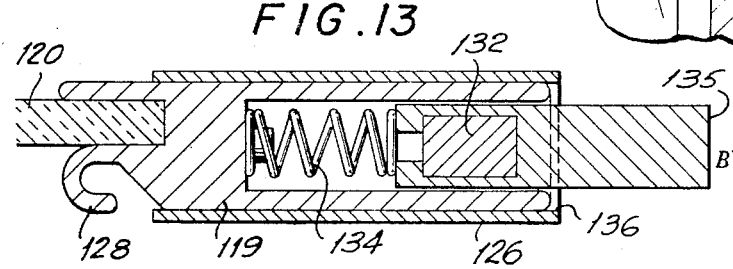

July 22, 1969   H. SHOENFELD ET AL   3,456,372
TRANSPARENCY-VIEWING APPARATUS
Filed May 23, 1967   8 Sheets-Sheet 8
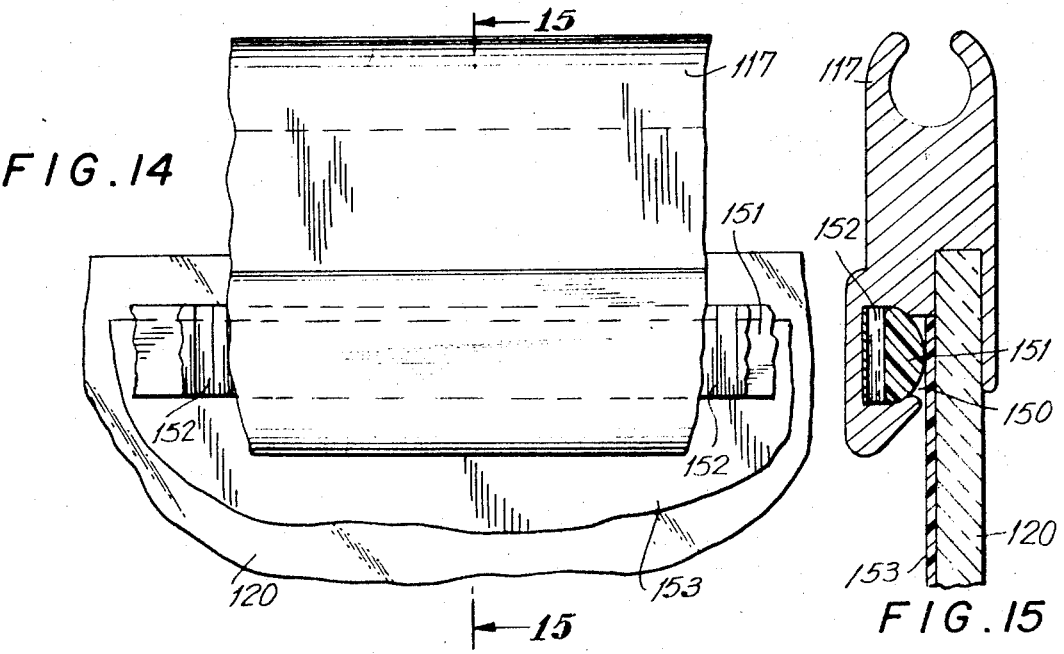
FIG.14
FIG.15
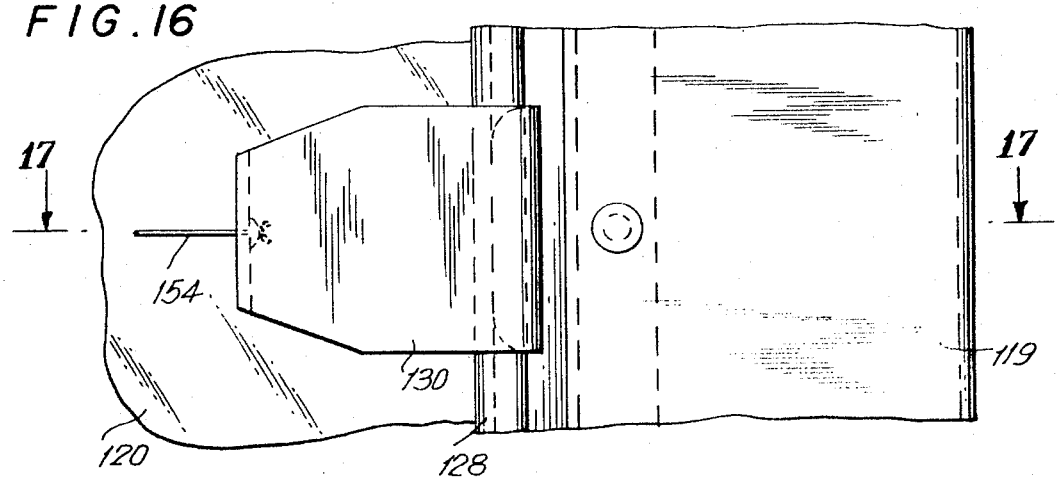
FIG.16
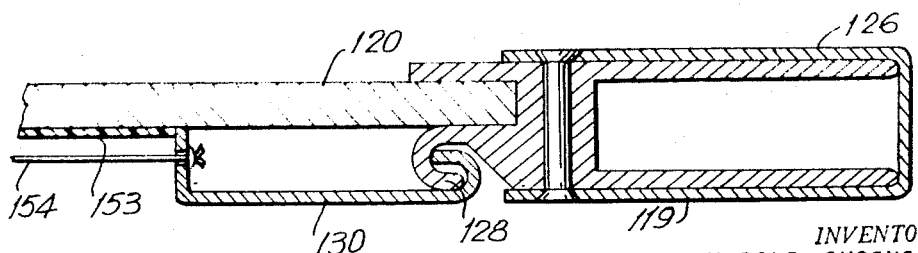
FIG.17
INVENTORS
HAROLD SHOENFELD
HAROLD WALKER
BY Burton L. Lilling
ATTORNEY ical, one being shown in detail in FIGURE 3. It will there
United States Patent Office 3,456,372
Patented July 22, 1969

3,456,372
TRANSPARENCY-VIEWING APPARATUS
Harold Shoenfeld, 2471 Coyle St., Brooklyn, N.Y.
11235, and Harold Walker, Brooklyn, N.Y.; said
Walker assignor to said Shoenfeld
Filed May 23, 1967, Ser. No. 640,655
Int. Cl. G09f 13/10
U.S. Cl. 40—106.1
10 Claims

ABSTRACT OF THE DISCLOSURE

The device of this invention includes essentially a conveyor for moving transparency holders past a viewing station, and a collection station for receiving holders from the conveyor, storing a relatively large quantity of holders, and delivering holders to the conveyor for return to the viewing station.

BACKGROUND OF THE INVENTION

While there have been proposed apparatus for viewing transparencies, including X-rays, film, and the like, these devices of the prior art have been subject to certain difficulties, including the relatively large size required for use with a substantial number of transparencies, as well as highly complex mechanisms substantially increasing initial cost and being subject to malfunction. Prior devices also were deficient in ease and speed of use, involving a relatively great effort and time for presentation of the particular X-rays to be viewed.

SUMMARY

Accordingly, it is an important object of the present invention to provide a transparency viewer, especially for X-rays and the like, which is capable of more quickly and easily presenting to view a relatively great number of transparencies, say X-rays being examined by a doctor, and wherein the apparatus, including the contained X-rays, occupies relatively little space.

It is a further object of the present invention to provide a viewing apparatus for X-rays and the like, of the type described, wherein X-rays may be viewed in a selected order, and also wherein a particular X-ray may be obtained for viewing in a minimum of time, and wherein the removal and replacement of a selected X-ray, or all of the X-rays may be quickly and expeditiously accomplished.

It is still a further object of the present invention to provide a transparency-viewing apparatus having the advantageous characteristics mentioned in the preceding paragraphs, which is extremely simple in construction, durable and reliable in operation throughout a long useful life, and which can be economically manufactured for sale at a reasonable price.

BRIEF DESCRIPTION OF THE DRAWINGS

FIGURE 1 is a front perspective view showing the entire transparency-viewing apparatus of the present invention;

FIGURE 2 is an elevational view showing a control panel of the apparatus of FIGURE 1;

FIGURE 3 is a side elevational view of the apparatus of FIGURE 1, taken in the direction of the arrow 3, with the side panel of the cabinet or enclosure removed;

FIGURE 4 is a partial sectional view taken generally along the line 4—4 of FIGURE 3;

FIGURE 5 is a top plan view of the apparatus of FIGURE 1, with the enclosure top wall removed;

FIGURE 6 is a partial sectional view taken generally along the line 6—6 of FIGURE 4;

FIGURE 7 is a partial sectional view taken generally along the line 7—7 of FIGURE 6;

FIGURE 8 is a partial sectional view taken generally along line 8—8 of FIGURE 5;

FIGURE 9 is a partial sectional view taken generally along the line 9—9 of FIGURE 8;

FIGURE 10 is a partial horizontal sectional view taken generally along the line 10—10 of FIGURE 1;

FIGURE 11 is a partial sectional view taken generally along the line 11—11 of FIGURE 6;

FIGURE 12 is a view similar to FIGURE 11, but illustrating a slightly different position;

FIGURE 13 is a sectional view taken generally along the line 13—13 of FIGURE 11;

FIGURE 14 is a partial front elevational view of the transparency holder showing the means for holding film;

FIGURE 15 is a partial sectional view taken generally along the line 15—15 of FIGURE 14;

FIGURE 16 is a partial front elevational view of the transparency holder showing a type of side mounted clip for holding film; and FIGURE 17 is a sectional view taken generally along the line 17—17 of FIGURE 16.

DESCRIPTION OF THE PREFERRED EMBODIMENTS

Referring now more particularly to the drawings, and specifically to FIGURES 1, 3 and 5 thereof, a transparency- or X-ray-viewing machine is there generally designated 20 and may include a cabinet or enclosure 21 supported on a pair of upstanding legs 22 and 23. The cabinet or enclosure 21 may include a front wall having a generally central viewing window 24, lower and upper panels 25 and 26, respectively below and above the viewing window, and upright side panels 27 and 28 respectively extending vertically on opposite sides of the panels 25 and 26, and intermediate window 24. The cabinet or enclosure 21 may include a bottom panel or wall 30 extending generally horizontally between the upper ends of legs 22 and 23. The front wall upstands from the forward edge of the bottom wall 30. A pair of side walls 31 and 32 upstand from opposite sides or ends of the bottom wall 30, extending rearwardly from the outer edges of the front wall side panels 27 and 28, respectively. An upstanding back wall or panel 33 may extend between the rear edges of the side walls 31 and 32, and a top panel or wall 34 may extend between the upper edges of the front, back and side walls.

Interiorly of the enclosure 21 is provided a suitable framework or supporting structure, generally designated 35, for supporting the operating mechanism. Details of the supporting framework 35 have been omitted for clarity.

Mounted interiorly of the cabinet 21, by the framework 35, is an endless conveyor 36. The conveyor 36 may include a pair of laterally spaced endless chains 37 and 38, each disposed in a generally vertical plane in adjacent, spaced parallel relation with respect to a respective enclosure side wall or panel 31 and 32. The endless-conveyor elements or chains 37 and 38 may be substantially identical, one being shown in detail in FIGURE 3. It will there be seen that the chain 38 includes forwardly and rearwardly spaced, generally vertical front and rear runs 39 and 40, and vertically spaced lower and upper, generally forwardly and rearwardly extending runs 41 and 42. In particular, the vertically extending forward run 39 is trained over an upper front sprocket 45 carried on a laterally extending horizontal shaft 46 and depends therefrom for vertical movement to and in meshing engagement with an intermediate front sprocket 47 carried on a laterally extending generally horizontal shaft 48. From the sprocket 47, the forward run depends obliquely rearwardly in meshing engagement with and beneath a lower front sprocket wheel 49 carried by a laterally extending horizontal shaft 50. From the sprocket wheel 49, the endless-conveyor element 38 extends along its lower run 41 generally rearwardly and downwardly beneath and in meshing engagement with a sprocket wheel 51 carried by a laterally extending horizontal shaft 52. Thence, the endless-conveyor element 38 extends upwardly and obliquely rearwardly along its rear run 40 in meshing engagement with a rear intermediate sprocket wheel 53 carried by a laterally extending horizontal shaft 54. The rear run 40 extends from the sprocket wheel 53 generally upwardly over an upper rear sprocket wheel 55 carried by a laterally extending horizontal shaft 56, and thence forwardly and obliquely upwardly along the upper run 42 for movement again over the upper front sprocket wheel 45. Of course, the endless conveyor element or chain 37 is substantially identical. Further, the chains 37 and 38 are each provided with a plurality of laterally inwardly extending pins, as at 59 and 60. The pins 59 and 60 of each chain 37 and 38 are spaced apart along the respective chain a distance slightly greater than that of an X-ray holder, as will appear presently; and further, respective pairs of pins 59 and 60 are in lateral, horizontal alignment with each other.

A power source or drive motor 61 is suitably mounted in the framework 35, and may include a speed reducer 62 having an output sprocket 63. Suitable power-transmission means, such as a drive chain 64 may be trained over the drive sprocket 63 and about a driven sprocket 65 which is carried on the shaft 52. The chain 64 is endless, and proceeds from the sprocket 65 in meshing engagement with a relatively large sprocket or wheel 66 carried by a laterally extending, horizontal shaft 67. From the sprocket wheel 66, the chain 64 passes about an idler sprocket wheel 68 to insure sufficient meshing engagement of the chain with the several wheels, and proper direction of wheel rotation. It will thus be understood that the endless elements 37 and 38 of the conveyor 36 are driven from the motor 61 through the chain 64 and shaft 52. A counterclockwise direction of movement of conveyor 36 may be employed, as seen in FIGURE 3.

An additional conveyor is generally designated 70, and includes a pair of laterally spaced endless elements or chains 71 and 72 respectively disposed in vertical planes adjacent to enclosure side walls 31 and 32, each adjacent to and spaced below the upper run of a respective conveyor element 37 and 38. The endless element or chain 72 of the additional conveyor 70 is substantially identical to the chain 71, and includes an upper run 73 extending in spaced parallelism with and below the upper run 42 of chain 38. The upper run 73 of chain 72 extends about a rear sprocket wheel 74, carried on a laterally extending horizontal shaft 75, and passes thence forwardly and obliquely upwardly for meshing engagement with a forward sprocket wheel 76 carried by a laterally extending horizontal shaft 77. From the sprocket wheel 76, the chain 72 extends downwardly and obliquely rearwardly, as at 78 for passage in meshing engagement with and beneath a sprocket wheel 79 carried by a laterally extending horizontal shaft 80, and thence proceeds rearwardly and obliquely upwardly, as at 81 for repeated movement about the rear sprocket wheel 74. Carried by the upper rear shaft 56 is an additional sprocket wheel 83, while an additional sprocket wheel 84 is carried by the shaft 80, and an endless transmission element or chain 85 is trained about the sprocket wheels 83 and 84 to effect synchronized driving of the additional conveyor 70 with respect to the conveyor 36. An idler sprocket wheel 86 may be provided in meshing engagement with the chain 85 to maintain proper tension.

The endless chains 72 and 71 of the additional conveyor 70 are moved in the same direction as the endless chains of conveyor 36, counterclockwise as seen in FIGURE 3; and further, the conveyors 70 and 36 are arranged to move at substantially the same linear speed. Carried by the endless elements or chains 71 and 72 of additional conveyor 70 are a plurality of laterally inwardly projecting pins or additional carriers 89 and 90, respectively. The carriers 89 and 90 of each chain 71 and 72 are spaced apart from each other a distance approximately equal to the spacing between the carriers 59 and 60 of the conveyor 36; and also, the carriers 89 and 90 of the additional conveyor 70 are located in lateral alignment with respect to each other.

Interiorly of the enclosure 21, directly behind the viewing window 24, may be suitable illuminating means, such as lower and upper reflectors 91 and 92, facing forwardly toward the window and containing suitable lamps 93 and 94.

Located in a lower region of the enclosure is a collection station, generally designated 95. The collection station 95 includes a pair of laterally spaced, generally horizontal forwardly and rearwardly extending support mechanisms 96, one being shown in detail in FIGURES 6 and 7. Each support mechanism 96 includes an inner and outer forwardly and rearwardly extending fixed support member or rack, as at 97 and 98, respectively. The inner and outer support members or racks 97 and 98 may be suitably fixed at their forward and rearward ends, as to frame members 99 and 100. The support members 97 and 98 are thus in parallel spaced relationship and fixed relative to each other and the framework 35. Interposed between the fixed support members 97 and 98 is a forwardly and rearwardly extending support member 101. The upper edges of the fixed support members 97 and 98 may be provided with upstanding teeth, as at 102 and 103, in the manner of a rack; and also, the the upper edge or margin of the intermediate member 101 may be provided with teeth 104, in the manner of a rack. The illustrated embodiment, which has proven satisfactory in operation, provides for teeth 104 on only the intermediate member 101. That is, teeth on the support members 97 and 98, as at 102 and 103, are not necessary.

A pair of shafts 106 and 107 are arranged in forwardly and rearwardly spaced relation, extending through the support members or racks 97, 101 and 98, being freely rotatably journaled in fixed support members or racks 97 and 98, as by respective bearings 108 and 109. The shaft 107 carries an eccentric or crank 110 between the fixed support members 97 and 98, lying in the plane of the intermediate support member 101, and rotatably received therein by suitable journal means 111. On one end of the shaft 107 is carried a sprocket wheel 112.

The shaft 106 is of similar construction, being journaled in the fixed support members or racks 97 and 98 and carrying an eccentric journaled in the intermediate support member or rack 101. Carried on the shaft 106, concentric therewith, is a sprocket wheel 113 generally coplanar with the sprocket wheel 112. An endless sprocket chain 114 is trained about the sprocket wheels 112, 113 and a sprocket wheel 115 carried on the shaft 67. By this means the sprocket wheels 112 and 113 are driven in synchronism with each other from the shaft 67 effecting parallel displacement of the intermediate support member or rack 101 about the axes of shafts 106 and 107. This parallel displacement of intermediate support member or rack 101, upon synchronous rotation of sprocket wheels 112 and 113, serves to move the teeth 104 of rack 101 vertically above the level of the surfaces 102 and 103 of the fixed members. At the same time, the teeth of the intermediate racks also move forwardly or rearwardly, while in their raised position, according to the direction of sprocket-wheel movement.

As will appear more fully hereinafter, articles supported on the pair of laterally spaced support mechanisms 96 are intermittently moved forwardly or rearwardly therealong, by the upward displacement of the supported articles upon elevation of the intermediate racks 101, forward or rearward displacement thereof, and lowering of the intermediate racks to replace the supported articles at a displaced location.

While only a single support mechanism 96 has been described in detail, with its operating chain-and-sprocket mechanism, it is understood that a substantially identical support mechanism may be provided on both sides of the enclosure 21, and, as will appear more fully hereinafter, the support mechanisms 96 define a collection station for receiving articles from the conveyor 36, storing the articles, and returning the articles to the conveyor.

As will be seen in FIGURE 8, the articles carried by the conveyor are a plurality of X-ray or transparency holders, generally designated 116. Each holder includes a generally rectangular, open frame having laterally extending top and bottom members 117 and 118, and a pair of laterally spaced normally vertical side members 119 extending between opposite ends of the upper and lower members. A transparent panel or pane 120 may extend between and close the central opening of the holder. Each top piece 117 includes a pair of oppositely projecting lateral extensions or carrier receivers 121, best seen in FIGURES 11 and 12. Each carrier receiver 121 has its distal end open, as at 122 and has its lower side partly closed, as by a fitting 123 having a cutout 124, for a purpose appearing presently. In practice, the top bottom and side pieces of each holder 116 may be fabricated of channel-like extrusions, the top piece having a covering channel 125 which projects at its opposite ends to define the receivers 121, and the side pieces having covering channels 126 each serving to close the respective holder side piece.

As noted, each carrier receiver 121 has its underside only partially closed by the fitting 124, leaving the distal or outer end region thereof opening downwardly.

In order to facilitate the securement of a transparency to a holder 116, means associated with the top, bottom and side pieces may be provided. For example, as best seen in FIGURES 14 and 15, the top and bottom members 117 and 118 may be each formed with a channel 150. Contact strip 151 and a corrugated spring strip 152 will be inserted within the channel 150 in cooperating relationship. It will be seen that the spring strip 152 will resiliently urge the contact strip 151 against the surface of the panel 120 thereby permitting a transparency 153 to be inserted between the adjacent surfaces of the panel 120 and the contact strip 151, and there be removably retained.

In addition, as seen in FIGURES 16 and 17, the side pieces 119 of the holders 116 may each be provided with hook-shaped extensions, as at 128. Guy wires 154 extending therebetween may be held in position across the outside surface of panel 120 as by clips 130 attaching to the hook-shaped extension 128.

Thus, it will be apparent that a transparency 153 may be retained in position on the holders 116 by either or a combination of both of the aforementioned means.

The opposite top-piece extensions or carrier receivers 121 of each holder 116 are adapted to receive a respective aligned pair of carriers 59 and 60, as best seen in FIGURE 11. In this condition, each holder 116 is moved upwardly along the rear run 40 of conveyor 36, thence forwardly along the upper run 42 and downwardly along the forward run 39, or reversely, if desired. Further, it is by engagement of the carriers 59 and 60 into respective carrier receivers 121 of a transparency holder 116 in the collection station 95 that the holders are removed from the collection station. That is, assuming counterclockwise movement of conveyor 36 and forward-to-rearward movement of the holders 116 in the collection station, the rearmost holder 116 receives in its respective carrier receivers 121 the carriers 59 and 60 for removal of the holder from the collection station. In the storage condition of the holders in the collection station 95, the holders are supported by supporting engagement of the support structures 96 with respective carrier receivers or extensions 121, but at locations inward from the open ends thereof. This support of a holder 116 at the collection station is shown in FIGURE 12, and a carrier 60 is illustrated in vertically spaced relation with respect to the carrier receiver 121, being movable into the latter or having just withdrawn from the carrier receiver, according to the direction of conveyor movement.

Interiorly of each holder sidepiece 126 is mounted a retainer 132, say in the form of an inverted L-shaped arm having a lateral end extension 133 located in the respective carrier receiver. The retainer 132 may be pivotally mounted in its respective holder sidepiece 126, as by a pivot pin 138 at the lower end of the retainer, and suitable resilient means, such as a spring 134, may urge the retainer laterally outwardly. In the retaining position of the retainer, as shown in FIGURE 11, the retainer arm 133 is extended outward within the carrier receiver 121, so as to effectively close the underside thereof and prevent withdrawal of a carrier 60 from the receiver. A suitably shaped wedge or cam 135 may be carried by the retainer 132, for movement therewith, between a retracted position within the respective sidepiece 126, and an extended position projecting laterally through an opening 136 in the holder sidepiece. In the condition of FIGURE 11, the retainer 132 is extended to its retaining position, the operating cam 135 projecting laterally through and beyond the sidepiece 126. The holder 116 may be considered as moving downward toward the collection station 95 in the direction of arrow 137, entering between the supporting mechanisms 96. Upon continued downward movement of the holder 116, the supporting mechanism 96 will engage the cam 135 to swing the retainer 132 inward, to the position of FIGURE 12, whereupon the carrier receiver 121 is opened, and the carrier receivers may engage on and be stopped in their vertical movement by the support mechanisms 96, the carriers 59 and 60 being free to continue their downward movement out of the carrier receivers, as shown in FIGURE 12. In this condition, the fittings 123 engage between adjacent teeth of the movable support members 101, in adjacent facing relation with the previously collected transparency holder, and are shifted forward or rearward by the supported mechanism, as described hereinbefore.

It will now be appreciated that the transparency holders 116 are effectively suspended during their vertical movement along conveyor runs 39 and 40, and swingable about the supporting carriers 59 and 60, although there is little or no tendency to swing. However, during movement along the upper run 42, there may be some tendency of holders 116 to swing and and possibly engage wih adjacent holders. To permit of relatively rapid operation and obviate the possibility of holders swinging, the sidepieces 126 of each holder 116 are formed with cutouts or receivers 140 for respective reception of the carriers 89 and 90 of additional conveyor 70. This condition is shown in FIGURES 8 and 9, so that forward movement of the holders 116 is accomplished with the holders effectively retained in vertical disposition. By synchronism of additional conveyor 70 with conveyor 36, the additional carriers 89 and 90 are freely engageable in the additional receivers 140 at the rearward end of the upper run, and freely disengageable from the receivers 140 at the forward end of the upper run.

Should it be desired to remove a particular X-ray or transparency from the apparatus, or remove the entire holder and transparency from the apparatus, this operation is greatly facilitated by the provision of a pair of openable closures 141 and 142 in respective front-wall panels 27 and 28. That is, the closures 141 and 142 may be hinged, as at 143 and 144 for swinging movement between their closed position, shown in solid lines of FIGURES 1 and 10, and an open position shown in phantom in FIGURE 10. When in the open position, a holder 116 may be raised and withdrawn forwardly to effect removal of the carriers 59 and 60 from their respective receivers 121. Of course, the cams 135 are depressed for this removal operation, to release the carriers. Replacement is readily accomplished by reversal of the above-described procedure.

By the use of a reversible drive motor 61 highly selective control may be employed, and a control panel, such as at 145 in FIGURE 2 has been found satisfactory. The control panel may include an on-off switch 146, a control switch 147 for selective continuous operation or alternatively, operation by a foot switch to leave the user's hands free. Illumination may be selectively controlled at different levels, as by switches 148, and a hand switch 149 may be utilized to effect a selected movement of transparency holders, either up, down or stationary.

From the foregoing, it is seen that the present invention provides an apparatus for viewing X-rays or transparencies which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. Viewing apparatus for X-rays, transparencies, and the like, comprising a supporting framework; a conveyor having a pair of forwardly and rearwardly spaced generally vertical runs and an upper run extending between the upper regions of said vertical runs; a plurality of X-ray holders each movable upwardly along one of said vertical runs, across along said upper run and downwardly along the other of said vertical runs; a viewing station along at least one of said vertical runs for viewing an X-ray in a holder; and a collection station between the lower regions of said vertical runs for receiving holders in a vertical position from either of said vertical runs, storing said holders vertically in a sequential series and delivering said holders selectively from either end of said series to one of said vertical runs.

2. Viewing apparatus according to claim 1, said conveyor comprising flexible endless elements for movement along said runs, and carriers at spaced locations on said endless elements for supporting said holders, said carriers being spaced apart at least the dimension of a holder along a vertical run for separate viewing of X-rays at said viewing station.

3. Viewing apparatus for X-rays according to claim 2, said collection station comprising a generally horizontal support for storing holders in adjacent facing relation with each other to minimize space requirements.

4. Viewing apparatus according to claim 2, in combination with an additional conveyor extending in parallel spaced relation below said upper run, and additional carriers on said additional conveyor engageable with holders supported on said upper run to maintain the latter generally vertical along said upper run.

5. Viewing apparatus according to claim 2, said holders each comprising a generally rectangular open frame; carrier receivers extending from opposite sides of said frame; and releasable retainers associated with said receivers for retaining carriers in said receivers.

6. Viewing apparatus according to claim 5, said collection station comprising a generally horizontal support for storing holders in adjacent facing relation with each other; said support being engageable with said retainers to release the latter for removal of said carriers and deposit of said frames on said support.

7. Viewing apparatus according to claim 5, in combination with an additional conveyor extending in parallel spaced relation below said upper run, additional carriers on said additional conveyors, and additional receivers on said frames below said first-mentioned receivers for receiving said additional carriers, whereby frames on said upper run are held in generally vertical disposition.

8. Viewing apparatus according to claim 5, said collection station comprising a fixed upwardly facing member for supporting said frames in adjacent facing relation, and a shiftable rack for intermittently moving said frames along said fixed member.

9. Viewing apparatus according to claim 7, said collection station comprising a fixed generally horizontal support for storing holders in adjacent facing relation with each other, and a shiftable rack for intermittently moving said frames along said horizontal support; said horizontal support being engageable with said retainers to release the latter for removal of said carriers and deposit of said frames on said horizontal support.

10. Viewing apparatus according to claim 1, in combination with a cabinet enclosing said framework, conveyor, holders, viewing station and collection station; said cabinet having a viewing window at said viewing station; and openable closure means at said viewing station affording access to a holder for removal or replacement.

References Cited
UNITED STATES PATENTS

| 1,027,606 | 5/1912 | Holden | 40—36 |
| 2,209,517 | 7/1940 | Flanagan et al. | 40—36 |
| 2,550,994 | 5/1951 | Gordon | 40—36 |
| 3,246,412 | 4/1966 | Sommerhoff | 40—106.1 |

EUGENE R. CAPOZIO, Primary Examiner
R. CARTER, Assistant Examiner

U.S. Cl. X.R.
40—36